United States Patent
Lou et al.

(10) Patent No.: US 9,638,984 B2
(45) Date of Patent: May 2, 2017

(54) SEARCH RANGE EXTENSION FOR DEPTH ASSISTED AUTOFOCUS

(71) Applicant: QUALCOMM Incorporated, San Diego, CA (US)

(72) Inventors: Ying Chen Lou, Escondido, CA (US); Sanket Krishnamurthy Sagar, San Diego, CA (US); Ruben Manuel Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/825,964

(22) Filed: Aug. 13, 2015

(65) Prior Publication Data

US 2016/0266467 A1 Sep. 15, 2016

Related U.S. Application Data

(60) Provisional application No. 62/131,160, filed on Mar. 10, 2015.

(51) Int. Cl.
*G03B 3/10* (2006.01)
*H04N 5/222* (2006.01)
(Continued)

(52) U.S. Cl.
CPC .............. *G03B 3/10* (2013.01); *G02B 7/285* (2013.01); *G03B 13/36* (2013.01); *H04N 5/2226* (2013.01); *H04N 5/23212* (2013.01)

(58) Field of Classification Search
CPC ........... H04N 5/23248; H04N 5/23258; H04N 5/23287; H04N 5/23212; H04N 5/23219;
(Continued)

(56) References Cited

U.S. PATENT DOCUMENTS 8,520,130 B2    8/2013    Sasaki
8,577,216 B2    11/2013    Li et al.
(Continued)

FOREIGN PATENT DOCUMENTS

EP    1684503 A1    7/2006
EP    2474850 A1    7/2012
EP    2515525 A2    10/2012

OTHER PUBLICATIONS

International Search Report and Written Opinion—PCT/US2016/016788—ISA/EPO—May 23, 2016.

*Primary Examiner* — Rochelle-Ann J Blackman
(74) *Attorney, Agent, or Firm* — Knobbe, Martens, Olson & Bear LLP

(57) ABSTRACT

Systems and methods described herein can adjust a search range generated by a camera using depth-assisted autofocus based in part on measuring focus values in a first search range. For example, in some embodiments, a method includes estimating a depth of an object to be captured in an image, determining a first range of lens positions based at least in part on the estimating, moving the lens of the camera to a plurality of lens positions within the first range of lens positions, capturing a plurality of images, the plurality of images being captured at one or more of the plurality of lens positions, generating one or more focus values based on the plurality of images, and determining one or more additional lens positions or a second range of lens positions based at least in part on the one or more focus values.

30 Claims, 7 Drawing Sheets

(51) Int. Cl.
*H04N 5/232* (2006.01)
*G02B 7/28* (2006.01)
*G03B 13/36* (2006.01)

(58) Field of Classification Search
CPC .... G03B 5/00; G03B 2217/005; G03B 17/14; G03B 2205/0015; G03B 2205/0092; G03B 3/10; G02B 7/282
USPC ...... 396/133, 125, 80; 348/208.99, 366, 345
See application file for complete search history.

(56) References Cited

U.S. PATENT DOCUMENTS

| | | |
|---|---|---|
| 8,837,932 B2 | 9/2014 | Lee et al. |
| 2007/0147817 A1 | 6/2007 | Li et al. |
| 2008/0012978 A1* | 1/2008 | Wang ................. G03B 13/36 348/345 |
| 2012/0169917 A1* | 7/2012 | Isobe ................. G02B 7/08 348/345 |
| 2012/0268647 A1* | 10/2012 | Nakagawa ......... H04N 5/23212 348/349 |
| 2014/0139695 A1 | 5/2014 | Kawai |
| 2016/0065834 A1* | 3/2016 | Chang ............... H04N 5/23212 348/347 |

* cited by examiner

SEARCH RANGE EXTENSION FOR DEPTH ASSISTED AUTOFOCUS

CROSS-REFERENCE TO RELATED APPLICATIONS

This patent application claims priority to U.S. Provisional Patent Application No. 62/131,160 filed Mar. 10, 2015 entitled "SEARCH RANGE EXTENSION FOR DEPTH ASSISTED AUTOFOCUS" and assigned to the assignee hereof. The disclosure of the prior Application is considered part of and is incorporated by reference in this Patent Application.

TECHNICAL FIELD

The present application relates generally to digital image processing, and more specifically to methods and systems for improving automatic digital image focus.

BACKGROUND

The use of open-loop voice coil motors in imaging devices using depth-assisted autofocus technology can decrease the accuracy and speed of finding a desired focusing position. However, with autofocus implementations using open-loop voice coil motors, an initial depth estimation using depth-assisted autofocus technology may be inaccurate, necessitating more adjustment by the autofocus technology before a desired focusing position is obtained. Accordingly, improvements in open-loop autofocus systems are needed.

SUMMARY

The systems, methods, and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

One innovation includes a method for autofocus, the method including receiving depth information of an object within a scene, determining, for an autofocus lens system, lens positions in a first range of lens positions based on the depth information, the first range of lens positions including a first lens position and a second lens position, setting a lens of the autofocus lens system to lens positions in the first range of lens positions, determining a first maximum focus value for the first range of lens positions, determining lens positions in a second range of lens positions based at least in part on the lens position corresponding to the first maximum focus value, setting the lens to lens positions in the second range of lens positions, determining a second maximum focus value for the second range of lens positions, and generating an image at the lens position corresponding to the greater of the first maximum focus value and the second maximum focus value. Various aspects may also be included in embodiments of this innovation, some of which are discussed below.

In some embodiments, the focus value indicates a measure of how well an image is focused, a higher focus value indicating a more well focused image. The method can also include determining a focus value at each of the lens positions in the first range of lens positions and determining a focus value at each of the lens positions in the second range of lens positions. In some embodiments, each lens position corresponds to a focusing distance for the auto focus lens system, the focusing distance at the first lens position in the first range of lens positions less than the focusing distance at the second lens position in the first range of lens positions. In some embodiments, the lens positions in the second range of lens positions are determined such that, the lens positions in the second range of lens positions have focusing distances less than the focusing distance at the first lens position when the first maximum focus value corresponds to the first lens position, and the lens positions in the second range of lens positions have focusing distances greater than the focusing distance at the second lens position when the first maximum focus value corresponds to the second lens position. In some embodiments, the focus value indicates sharpness or contrast of the image. In some embodiments, setting the lens includes moving the lens by an open-loop VCM actuator. In some embodiments, the lens positions in the first range of lens positions are separated by a uniform step size, the step size corresponding to one or more intermediate lens positions between the lens position in the first range of lens positions. In some embodiments, the method further includes determining an order to set the lens to lens positions in the second range of lens positions that minimizes a total time to set the lens to each lens position. In some embodiments, determining, for an autofocus lens system, lens positions in a first range of lens positions includes determining an estimated depth of the object, determining a first intermediate lens position corresponding to a focusing distance corresponding to the estimated depth of the object, and determining the first lens position and second lens position based on a tolerance on each side of the first intermediate lens position.

Another innovation includes a non-transitory computer readable storage medium storing instructions that, when executed, cause at least one physical computer processor to perform a method including receiving depth information of an object within a scene, determining, for an autofocus lens system, lens positions in a first range of lens positions based on the depth information, the first range of lens positions including a first lens position and a second lens position, setting a lens of the autofocus lens system to lens positions in the first range of lens positions, determining a first maximum focus value for the first range of lens positions, determining lens positions in a second range of lens positions based at least in part on the lens position corresponding to the first maximum focus value, setting the lens to lens positions in the second range of lens positions, determining a second maximum focus value for the second range of lens positions, and generating an image at the lens position corresponding to the greater of the first maximum focus value and the second maximum focus value.

The method can also include determining a focus value at each of the lens positions in the first range of lens positions and determining a focus value at each of the lens positions in the second range of lens positions. In some embodiments, each lens position corresponds to a focusing distance for the lens system, the focusing distance at the first lens position in the first range of lens positions less than the focusing distance at the second lens position in the first range of lens positions. In some embodiments, the lens positions in the second range of lens positions are determined such that, the lens positions in the second range of lens positions have focusing distances less than the focusing distance at the first lens position when the first maximum focus value corresponds to the first lens position, and the lens positions in the second range of lens positions have focusing distances greater than the focusing distance at the second lens position when the first maximum focus value corresponds to the second lens position. The method can also include determining an estimated depth of the object, determining a first intermediate lens position in the first range of lens positions corresponding to a focusing distance corresponding to the estimated depth of the object, and determining the first lens position and second lens position in the first range of lens positions based on a tolerance on each side of the first intermediate lens position.

Another innovation includes an apparatus, including an autofocus lens system including a lens moveable to a plurality of lens positions within a first range of lens positions and a plurality of lens positions within a second range of lens positions, an image sensor configured to capture a plurality of images, a memory component configured to store images captured by the image sensor, a depth sensor configured to capture depth information of an object within a scene, an actuator coupled to the autofocus lens system and configured to move the lens to the plurality of lens positions within the first range of lens positions in response to the depth information, and a processor in communication with the memory component, the actuator, the image sensor, and the depth sensor. The processor is configured to determine a focus value at each of the lens positions in the first range of lens positions, and if a maximum focus value is not determined within the first range of lens positions, determine the plurality of lens positions within the second range of lens positions, and determine a focus value at each of the lens positions within the second range of lens positions. The actuator is further configured to move the lens to the plurality of lens positions within the second range of lens positions. The processor is further configured to generate an image at a lens position corresponding to the maximum focus value determined.

In some embodiments of the apparatus, the focus value indicates a measure of how well an image is focused, a higher focus value indicating a more well focused image. In some embodiments, the processor is further configured to control the actuator to set the lens to a lens position corresponding to the maximum focus value determined. In some embodiments, each lens position corresponds to a focusing distance for the lens system, the focusing distance at the first lens position in the first range of lens positions less than the focusing distance at the second lens position in the first range of lens positions. In some embodiments, the lens positions in the second range of lens positions are determined such that, the lens positions in the second range of lens positions have focusing distances less than the focusing distance at the first lens position when the highest focus value determined for the first range of lens positions corresponds to the first lens position, and the lens positions in the second range of lens positions have focusing distances greater than the focusing distance at the second lens position when the highest focus value determined for the first range of lens positions corresponds to the second lens position. In some embodiments, the focus value indicates sharpness or contrast of the image. In some embodiments, the actuator includes an open-loop VCM actuator. In some embodiments, the lens positions in the first range of lens positions are separated by a uniform step size, the step size corresponding to one or more intermediate lens positions between the lens position in the first range of lens positions. In some embodiments, the processor is configured to determine an order to set the lens to lens positions in the second range of lens positions that minimizes a total time to set the lens to each lens position. In some embodiments, the processor is further configured to determine an estimated depth of the object, determine a first intermediate lens position in the first range of lens positions corresponding to a focusing distance corresponding to the estimated depth of the object, and determine the first lens position and second lens position in the first range of lens positions based on a tolerance on each side of the first intermediate lens position.

Another innovation includes an apparatus including an autofocus lens system including a lens moveable to a plurality of lens positions within a first range of lens positions and a plurality of lens positions within a second range of lens positions, a means for capturing a plurality of images, a means for storing captured images, a means for capturing depth information of an object within a scene, a means for setting the position of the lens configured to move the lens to the plurality of lens positions within the first range of lens positions in response to the depth information, and a processor. The processor can be configured to determine a focus value at each of the lens positions in the first range of lens positions, and if a maximum focus value is not determined within the first range of lens positions, determine the plurality of lens positions within the second range of lens positions, and determine a focus value at each of the lens positions within the second range of lens positions. The means for setting the position of the lens is further configured to move the lens to the plurality of lens positions within the second range of lens positions. The processor is further configured to generate an image at a lens position corresponding to the maximum focus value determined.

In some embodiments of the apparatus, the focus value indicates a measure of how well an image is focused, a higher focus value indicating a more well focused image. In some embodiments, the processor is further configured to control the means for setting the position of the lens to set the lens to a lens position corresponding to the maximum focus value determined. In some embodiments, each lens position corresponds to a focusing distance for the lens system, the focusing distance at the first lens position in the first range of lens positions less than the focusing distance at the second lens position in the first range of lens positions. In some embodiments, the lens positions in the second range of lens positions are determined such that, the lens positions in the second range of lens positions have focusing distances less than the focusing distance at the first lens position when the highest focus value determined for the first range of lens positions corresponds to the first lens position, and the lens positions in the second range of lens positions have focusing distances greater than the focusing distance at the second lens position when the highest focus value determined for the first range of lens positions corresponds to the second lens position. In some embodiments, the focus value indicates sharpness or contrast of the image. In some embodiments, the lens positions in the first range of lens positions are separated by a uniform step size, the step size corresponding to one or more intermediate lens positions between the lens position in the first range of lens positions. In some embodiments, the processor is configured to determine an order to set the lens to lens positions in the second range of lens positions that minimizes a total time to set the lens to each lens position. In some embodiments, the processor is configured to determine an estimated depth of the object, determine a first intermediate lens position in the first range of lens positions corresponding to a focusing distance corresponding to the estimated depth of the object, and determine the first lens position and second lens position in the first range of lens positions based on a tolerance on each side of the first intermediate lens position.

DETAILED DESCRIPTION

Figure 1:
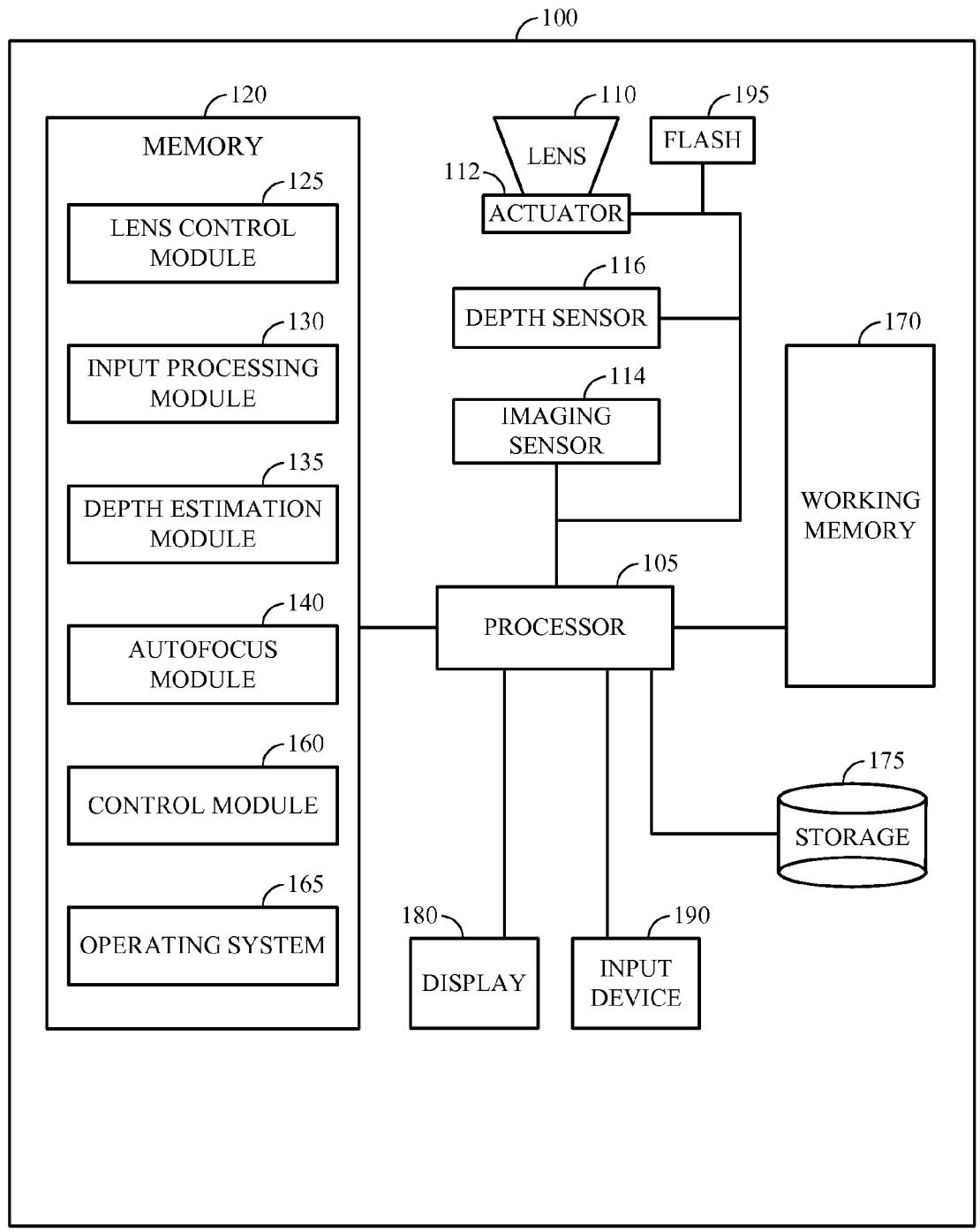
FIG. 1 is a block diagram illustrating an example of an imaging device implementing some operative embodiments.

The autofocusing feature of a digital imaging system (for example, a digital camera) is highly desirable because it allows the system to focus on an object or a scene quicker than most (if not all) users can focus manually. An autofocusing feature generally uses the sharpness or contrast value of a number of images using different lens positions of a moveable lens assembly (the lens positions corresponding to different focusing distances) to determine the appropriate lens position. Each lens position corresponds to a focus point of the imaging device, that is, a point in the field of view (FOV) of the imaging device at which the imaging device can focus an object at the point on a sensor. The images captured during an autofocus (AF) operation may be stored in temporary buffers. A processor then processes the images and computes a focus value based on the sharpness or contrast value of the images. The processor then controls the movement of the lens to the desired lens position, the appropriate lens position to bring the object or scene into focus.

There are generally two types of distance estimation methods for cameras. One type of distance estimation uses an active sensor. Active sensors can include ultrasound or light from a laser to measure the "time of flight." Another type of distance estimation is done with passive sensors. Passive sensor methods include phase detection, which is achieved by dividing the incoming light into pairs of images and comparing them, and use of a dual camera system (for example, a range finder), which involves two calibrated cameras to provide focus information.

One challenge with present digital autofocus technologies is the time consuming nature of the autofocus routine. Present digital autofocus technologies may require analysis of a relatively large range of potential lens positions, in reference to the total range of possible lens positions, in order to determine the desired lens position. Another challenge is an inability of a digital camera to recognize when the lens assembly/focusing mechanism is no longer calibrated correctly, which may be caused by, for example, events that cause a physical change or movement of the lens or an actuator that is configured to move the lens during autofocus. Such events can include, for example, a physical impact to the camera, a change in an environmental condition (e.g., temperature or humidity), or mechanical wear.

Contrast-based autofocus generally utilizes a coarse search, one in which images are captured using different lens positions covering a wide range of possible lens positions, or search range, followed by a fine search covering a smaller range of lens positions based on the contrast values determined in the coarse search, to determine a lens position for capturing an image.

Most depth-assisted AF technologies, such as phase detection AF, time-of-flight AF, and dual camera AF, generate a depth estimation and then convert the depth estimation to an estimated lens position to bring an object or scene into focus. Generally, depth estimation is utilized to decrease the range of potential lens positions for capturing an image. The range of lens positions is then used in performing a search with contrast-based AF.

Depth-assisted AF may present advantages over pure contrast-based AF. For example, using depth-assisted AF to determine one or more lens positions for focusing can result in a shorter autofocus operation than performing a coarse search using contrast-based AF and then performing a fine search. However, the larger the search range determined using depth-assisted AF, the less gain in speed the depth-assisted AF can achieve over a purely contrast-based AF. On the other hand, if the determined search range is too small, a desired lens position for capturing an image may fall outside of the search range, and accuracy of the focusing operation may be affected.

The accuracy and speed of depth-assisted AF is generally higher when a closed-loop voice coil motor ("VCM") actuator is used to adjust the position of the lens. In closed-loop VCM, absolute position of the lens with respect to an image sensor is known. Additionally, a feedback loop and/or lateral magnetic force allows the lens position to be locked, free from the influence of gravity. Furthermore, lens movement can be repeatable since a feedback loop causes the lens actuation process to self-correct any error in the process.

However, closed-loop VCM actuators are incompatible with optical image stabilization (OIS) and can be more expensive than other lens actuators, such as open-loop VCM actuators. Consequently, many cameras utilize open-loop VCM actuators.

Open-loop VCM poses serious challenges for depth-assisted AF in terms of accuracy and speed. When open-loop VCM is used, the search range generated from depth-assisted AF may not always cover a desired lens position due to lens shift caused by VCM hysteresis, sensitivity, and camera orientation. However, as explained above, enlarging the search range can decrease the speed for determining a lens position, thereby mitigating advantages of applying depth-assisted AF.

Open-loop VCM has several characteristics which can cause the desired lens position for capturing an image to fall outside of a generated search range. First, the absolute position of the lens with respect to the image sensor is unknown. Additionally, the position of the lens can change in response to the camera pitch (up/down) due to the influence of gravity. Furthermore, movement of the lens is not precisely repeatable since no feedback loop exists when using open-loop VCM. Lens movement is also impacted by actuator hysteresis.

When using open-loop VCM, the reported object distance determined, using depth-assisted AF or laser AF for example, is converted to a lens position which, as described above, is sensitive to VCM sensitivity, orientation and hysteresis. Thus, sensitivity calibration and orientation calibration are critical. Module to module sensitivity can vary significantly. However, calibration data usually does not take module to module sensitivity into account. Heating also affects sensitivity, the effects of which are not generally measured or compensated. Furthermore, with open-loop VCM, the sensitivity can change with orientation and the manufactory calibration data may be inaccurate. Inaccurate sensitivity calibration and orientation calibration may further lead to a fine search range determination that fails to encompass a desired lens position for capturing an image.

Changes in camera orientation may cause an object within a scene to be mapped to different lens positions despite having the same distance from the camera. Even with accurate orientation compensation, an open-loop VCM autofocus process may restart more often than a closed-loop VCM in response to a change in orientation. If orientation compensation is not accurate, either because of the compensation method or because of insufficient calibration data, the accuracy of a mapped lens position may be further affected.

Use of an open-loop VCM may also cause complications with time-of-flight (TOF) distance-based scene change detection because, over time, the focusing position of a lens as determined by a TOF determined distance may result in moving the lens to a position that is assumed to be appropriate to bring an object or scene into-focus when in fact such movement of the lens does not account for inaccuracies in the systems that may have occurred over time, resulting in a systematic inaccuracy when attempting to place the lens in a desired lens position.

The following detailed description is directed to various embodiments of the teachings herein. However, the features disclosed can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

The examples, systems, and methods described herein are described with respect to digital camera technologies. The systems and methods described herein may be implemented on a variety of different digital camera devices. These include general purpose or special purpose digital camera systems, environments, or configurations. Examples of digital camera systems, environments, and configurations that may be suitable for use with the features of the present disclosure include, but are not limited to, digital cameras, hand-held or laptop devices, and mobile devices (e.g., phones, smart phones, Personal Data Assistants (PDAs), Ultra Mobile Personal Computers (UMPCs), and Mobile Internet Devices (MIDs)).

In one embodiment, a depth-assisted AF technology is used to determine lens positions in a search range, a range of lens positions which may contain a desired lens position for capturing an image, and the search range is then adaptively adjusted. First, a relatively small search range is set based on a depth estimation value provided by the depth-assisted AF. The search range may then be extended from the beginning or end of the original search range depending, for example, on the magnitude of focus values determined for images captured at each lens position determined for the search range. Setting a small default search range ensures fast focus. By extending the search range based on the magnitude of the focus values, accuracy can still be guaranteed even if the desired lens position falls outside of the initial search range as determined by the depth estimation. The present invention may be applicable in any depth-assisted AF technology, for example, phase detection AF, laser AF, time-of-flight AF and dual camera AF.

The extent to which the search range is extended may depend on differences in magnitude between focus values for images captured at each lens position determined in a range of lens positions. Alternatively, the extent to which the search range is extended may be a predefined value or a user selected value. The search range may be extended multiple times. In some embodiments, the search range will be extended until a maximum focus value is detected. Alternatively, a maximum number of extensions may be predefined. If a maximum focus value is not detected within those extensions, the lens position having the highest focus value within the range searched can be utilized as the desired lens position. Alternatively, the search range may be extended any number of times until a predefined difference in focusing distance or predefined number of lens positions from the initial search range is achieved.

FIG. 1 depicts a block diagram illustrating an example of an imaging device that may be used to implement various embodiments. The imaging device 100 may include a processor 105 operatively connected to an image sensor 114, a depth sensor 116, a lens 110, an actuator 112, a working memory 170, a storage 175, a display 180, an input device 190, and a flash 195. In addition, processor 105 is connected to a memory 120. In this example, the illustrated memory 120 stores several modules that store data values defining instructions to configure processor 105 to perform functions relating to the imaging device 100. In this example, the memory 120 includes a lens control module 125, an input processing module 130, a depth estimation module 135, an autofocus module 140, a control module 160, and an operating system 165.

In an illustrative embodiment, light enters the lens 110 and is focused on the image sensor 114. In some embodiments, the lens 110 is part of an autofocus lens system which can include multiple lenses and adjustable optical elements. In one aspect, the image sensor 114 utilizes a charge coupled device. In another aspect, the image sensor 114 utilizes either a CMOS or CCD sensor. The lens 110 is coupled to the actuator 112, and is moved by the actuator 112 relative to the image sensor 114. The actuator 112 is configured to move the lens 110 in a series of one or more lens movements during an AF operation, for example, adjusting the lens position to change the focus of an image, an example of which is described below with respect to FIG. 2. When the lens 110 reaches a boundary of its movement range, the lens 110 or actuator 112 may be referred to as saturated. In an illustrative embodiment, the actuator 112 is an open-loop VCM actuator. However, the lens 110 may be actuated by any method known in the art including a closed-loop VCM, Micro-Electronic Mechanical System (MEMS), or a shape memory alloy (SMA).

The depth sensor 116 is configured to estimate the depth of an object to be captured in an image by the imaging device 100. The depth sensor 116 may be configured to perform a depth estimation using any technique applicable to determining or estimating depth of an object or scene with respect to the imaging device 100, including AF techniques for estimating depth such as phase detection AF, time-of-flight AF, laser AF, or dual camera AF. The techniques may also be applied using depth or location information received by the imaging system 100 from or about an object within a scene.

The display 180 is configured to display images captured via lens 110 and may also be utilized to implement configuration functions of device 100. In one implementation, display 180 can be configured to display one or more objects selected by a user, via an input device 190, of the imaging device. In some embodiments, the imaging device 100 may not include the display 180.

The input device 190 may take on many forms depending on the implementation. In some implementations, the input device 190 may be integrated with the display 180 so as to form a touch screen display. In other implementations, the input device 190 may include separate keys or buttons on the imaging device 100. These keys or buttons may provide input for navigation of a menu that is displayed on the display 180. In other implementations, the input device 190 may be an input port. For example, the input device 190 may provide for operative coupling of another device to the imaging device 100. The imaging device 100 may then receive input from an attached keyboard or mouse via the input device 190. In still other embodiments, the input device 190 may be remote from and communicate with the imaging device 100 over a communication network, e.g., a wireless network.

The working memory 170 may be utilized by the processor 105 to store data dynamically created during operation of the imaging device 100. For example, instructions from any of the modules stored in the memory 120 (discussed below) may be stored in working memory 170 when executed by the processor 105. The working memory 170 may also store dynamic run time data, such as stack or heap data utilized by programs executing on processor 105. The storage 175 may be utilized to store data created by the imaging device 100. For example, images captured via image sensor 114 may be stored on storage 175. Like the input device 190, the storage 175 may also be located remotely, i.e., not integral with the imaging device 100, and may receive captured images via the communication network.

Figure 2:
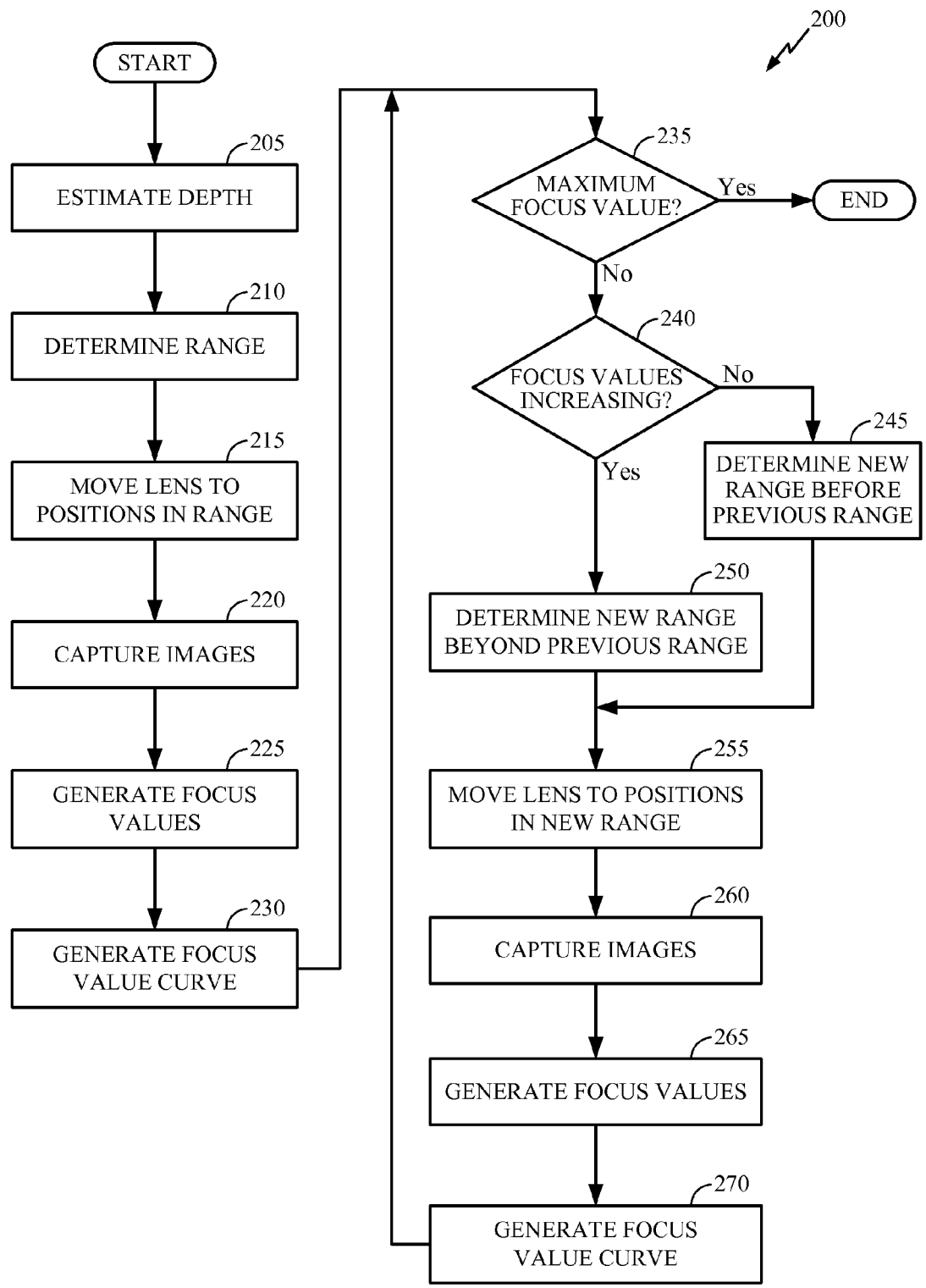
FIG. 2 is a flowchart illustrating an example of an embodiment of a method of adjusting a camera lens according to some embodiments.

The memory 120 may be considered a computer readable media and stores several modules. The modules store data values defining instructions for processor 105. These instructions configure the processor 105 to perform functions of device 100. For example, in some aspects, memory 120 may be configured to store instructions that cause the processor 105 to perform method 200, or portions thereof, as described below and as illustrated in FIG. 2. In the illustrated embodiment, the memory 120 includes a lens control module 125, an input processing module 130, a depth estimation module 135, an autofocus module 140, a control module 160, and an operating system 165.

The control module 160 may be configured to control the operations of one or more of the modules in memory 120.

The operating system module 165 includes instructions that configure the processor 105 to manage the hardware and software resources of the device 100.

The lens control module 125 includes instructions that configure the processor 105 to control the actuator 112 to move or set the lens 110 to a lens position. Instructions in the lens control module 125 may configure the processor 105 to determine a lens position for lens 110. In some aspects, instructions in the lens control module 125 may configure the processor 105 to control an aperture (not shown) of the lens 110 to achieve a certain exposure so as to, in conjunction with image sensor 114, capture an image. Therefore, instructions in the lens control module 125 may represent one means for capturing an image with an image sensor 114 and lens 110.

In another aspect, the lens control module 125 can include instructions that configure the processor 105 to receive position information of lens 110, along with other input parameters. The lens position information may include current and target lens positions. Therefore, instructions in the lens control module 125 may be one means for generating input parameters defining a lens position. In some aspects, instructions in the lens control module 125 may represent one means for determining current and/or target lens position.

The input processing module 130 includes instructions that configure the processor 105 to read input data from the input device 190. In one aspect, input processing module 130 may configure the processor 105 to detect objects within an image captured by the image sensor 114. In another aspect, input processing module 130 may configure processor 105 to receive a user input from input device 190 and identify a user selection or configuration based on the user manipulation of input device 190. Therefore, instructions in the input processing module 130 may represent one means for identifying or selecting one or more objects within an image.

The depth estimation module 135 includes instructions that configure the processor 105 to estimate the depth of an object to be captured in an image by the imaging device 100 via depth sensor 116. Depth estimation may be performed using any technique applicable to determining or estimating depth of an object or scene with respect to the imaging device 100, including AF techniques for estimating depth such as phase detection AF, time-of-flight AF, laser AF, or dual camera AF. The techniques may also be applied using depth or location information received by the imaging system 100 from or about an object within a scene.

The autofocus module 140 includes instructions that configure the processor 105 to determine lens positions in a range of lens positions of the lens 110 that may include a desired lens position for capturing an image. The determined lens positions may not include every possible lens position within a range of lens positions, but may include only a subset of the possible lens positions within the range of lens positions. The determined lens positions may be separated by a step size of one or more possible lens positions between determined lens positions. For example, the determined lens positions can include a first lens position at one end of the range of lens positions, the first lens position representing a first focusing distance, and a second lens position at the other end of the range of lens positions, the second lens position representing a second focusing distance. The determined lens positions may further include one or more intermediate lens positions, each intermediate lens position representing a focusing distance between the first and second focusing distances, where the determined lens positions are separated by a step size of one or more possible lens positions between the determined lens positions in the first range of lens positions. In an illustrative embodiment, the processor 105 may determine lens positions in a range of lens positions based at least in part on an estimation of the depth of an object. The autofocus module 140 may also include instructions that configure the processor 105 to determine or generate focus values for images captured at one or more lens positions within the range of lens positions. The desired lens position for capturing an image may be a lens position having a maximum focus value. The autofocus module 140 may also include instructions that configure the processor to determine or generate a focus value curve or data representative of a focus value curve based on the determined or generated focus values. The autofocus module 140 may also include instructions that configure the processer to determine lens positions in a search range of lens positions based at least in part on generated focus values or a focus value curve or data representative of a focus value curve based on a previous search range of lens positions.

FIG. 2 depicts a flowchart of one embodiment of a process 200 for an embodiment of adjusting a camera lens. The process 200 begins at a start block and then moves to block 205, wherein a depth of an object is estimated or received by an imaging device, such as imaging device 100 illustrated in FIG. 1. The imaging device 100 may estimate depth utilizing methods such as phase detection AF, time-of-flight AF, laser AF, or dual camera AF or other methods.

Figure 3B:
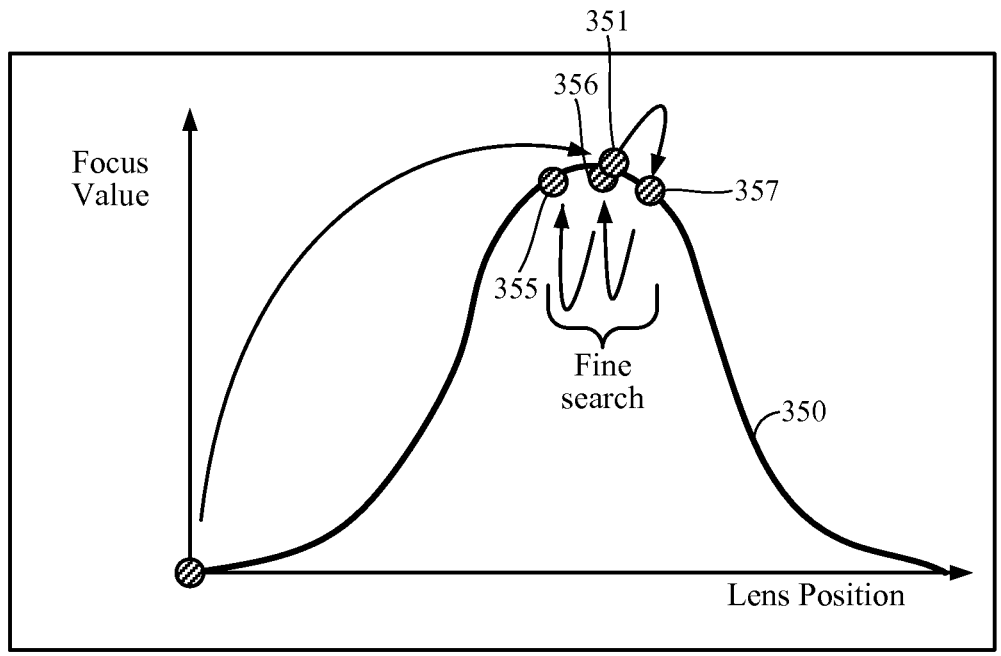
FIG. 3B is a graph illustrating an example of a focus value curve that illustrates depth-assisted autofocus according to some embodiments.
Figure 4A:
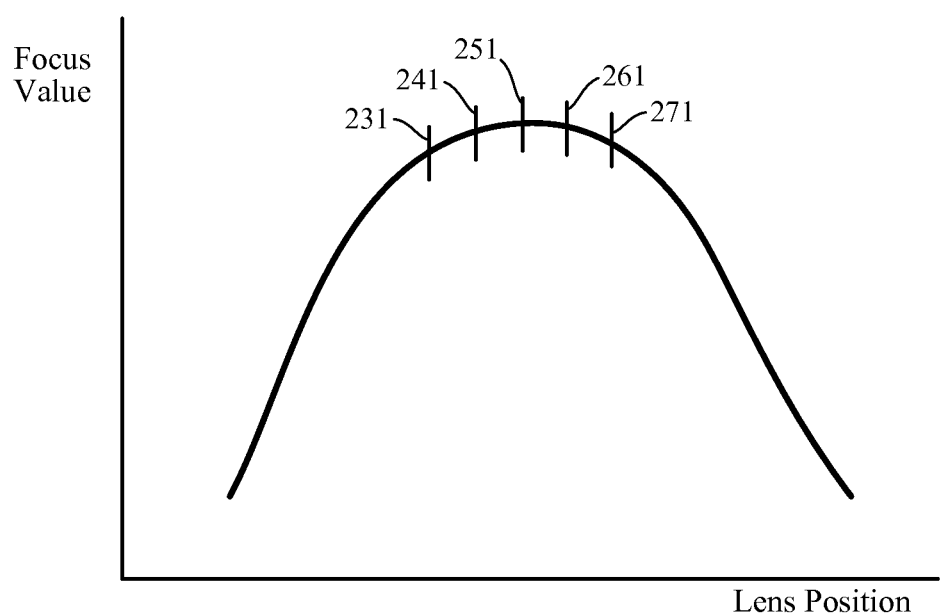
FIG. 4A is a graph showing focus value curve representing some embodiments.
Figure 4B:
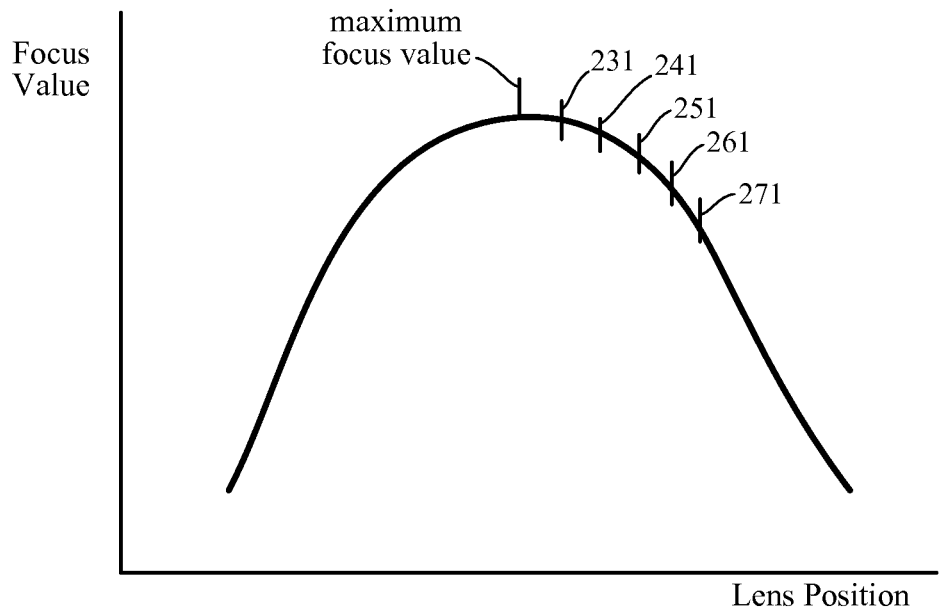
FIG. 4B is a graph showing focus value curve representing some embodiments.
Figure 4C:
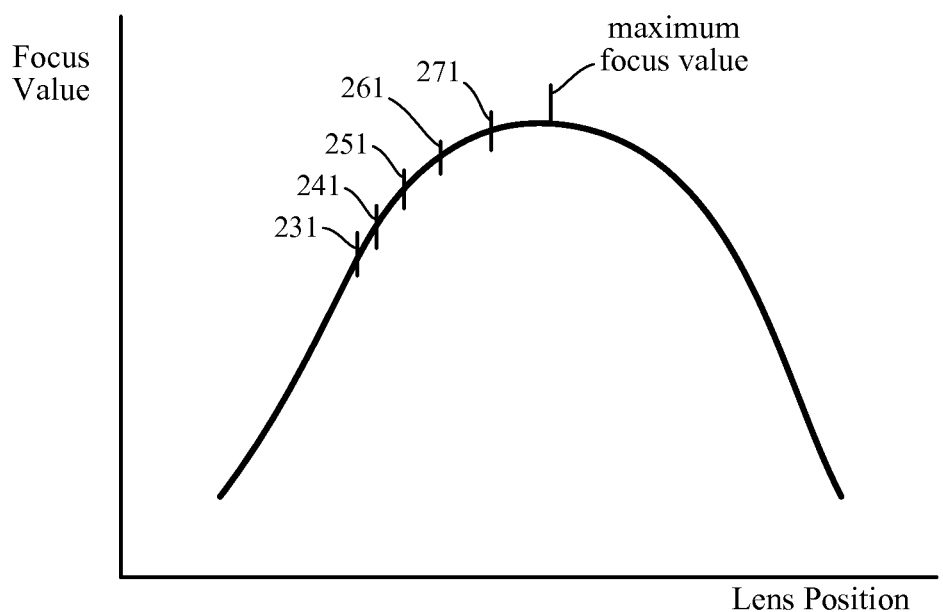
FIG. 4C is a graph showing focus value curve representing some embodiments.

After the depth of an object is estimated or received, the process 200 moves to block 210, wherein a range of lens positions, the search range, or lens positions within a range of lens positions are determined. The lens positions in the search range are determined based at least in part on the depth estimation described with respect to block 205. The search range constitutes a subset of the total amount of possible lens positions which can vary in different imaging devices. For example, an imaging device may contain 200, 400 or 600 possible lens positions. The determined lens positions may be determined so that the search range provides an estimate of a range containing a maximum focus value. The determined lens positions may include a first and a second lens position. The determined lens positions may include a first lens positions, a second lens position, and one or more intermediate lens positions. Alternatively, the determined lens positions may include only a first lens position and a second lens positions. In various embodiments, one or more intermediate lens positions may be determined at a later time. An example of lens positions in a search range in accordance with certain embodiments is illustrated in FIG. 3B below, wherein the search range is depicted by the portion of the curve beginning at a lens position 355 and extending to a lens position 357. Another example of lens positions in a search range is illustrated in FIGS. 4A-C. After the depth of an object is estimated or received, a corresponding lens position may be estimated. A tolerance on each side of the estimated lens position can define the first and second lens positions or the outer boundaries of the search range. In some embodiments, a tolerance on each side of the estimated lens position can be two times the amount of a step size between determined lens positions. The step size can include a number of possible lens positions between the determined lens positions in a range of lens positions. Thus, in some embodiments, a search range may extend from twice the step size on one side of the estimated lens position to twice the step size on the other side of the estimated lens position. The step size can vary from imaging device to imaging device and can be based on focal length, aperture size, and pixel size.

After the lens positions in the range of lens positions are determined, the process 200 moves to block 215, wherein a lens of a camera, such as lens 110 depicted in FIG. 1, is moved or set to the determined lens positions within the search range. The lens may be moved or set by an actuator, such as actuator 112 depicted in FIG. 1.

The process 200 then moves to a step 220 wherein images are captured by the imaging device at each determined lens positions within the search range. It should be recognized that blocks 215 and blocks 225 can be performed in concert, wherein an image is captured at a determined lens position after the lens is moved or set to the determined lens position by the actuator and before the lens is set to another determined lens position.

After the images are captured, the process 200 moves to block 225, wherein a focus values is generated or determined for each captured image. In some embodiments, a focus value may be generated or determined for each image after the image is captured but prior to the capture of a subsequent image. A focus value may be based at least in part on a sharpness or contrast value of an image, wherein a higher focus value indicates improved focus of an image. The process 200 then moves to block 230 wherein a focus value curve or a set of data representing a focus value curve is generated or determined, such as focus value curves 400 and 450 illustrated in FIGS. 4D and 4E below.

After the focus value curve or set of data representing a focus value curve is generated or determined, the process 200 moves to decision block 235, wherein a determination is made whether the maximum focus value is within the search range. The determination may be based at least in part on a slope of the focus value curve or data representative of the slope of the focus value curve. In one embodiment, a determination can be made that the maximum focus value is within the search range if a slope of the focus value curve or a set of data representing the slope of a focus value curve is zero at any point within the focus value curve. In some embodiments, a focus value curve may not be generated. Instead, a determination can be made whether the maximum focus value is within the search range by comparing the focus values and corresponding lens positions of the focus values. It may be determined that a maximum focus value exists if a focus value at a lens position is higher than the focus values at lens positions before and after the lens position. In some embodiments, the determination of whether a maximum focus value is within the search range may be performed before capturing images at all lens positions within the search range. The determination of whether a maximum focus value is within the search range may be performed after each image is captured. In some embodiments, it may be determined that a maximum focus value is within the range of lens positions if the highest determined focus value corresponds to an intermediate lens position in the search range.

If the maximum focus value is within the search range, the process 200 concludes at an end step. The image captured at the maximum focus value may then be retained or an image may be captured at the lens position corresponding to the maximum focus value.

If the maximum focus value is not within the search range, the process 200 moves to decision block 240, wherein a determination is made whether the focus values are increasing at the end of the search range corresponding to the farthest lens position within the search range as represented on a focus value curve. The farthest lens position may correspond to the farthest physical position to which the lens is moved by the actuator within the search range. The farthest lens position may also correspond to the farthest focusing position or focusing distance of the lens or autofocus lens system within the search range. In some embodiments, the camera can include multiple optical elements that may be adjusted to change the focal position from the closest focal position to infinity. Alternative determinations can be made to determine if the maximum focus value falls outside of the focus value curve or set of data representing the focus value curve. For example, a determination can be made whether the focus values are decreasing at the end of the search range corresponding to the closest lens position within the search range as represented on the focus value curve, which may correspond to the closest physical position to which the lens is moved by the actuator or to the closest focusing position or focusing distance of the lens within the search range.

If it is determined that the focus values are increasing, the process 200 moves to block 250, wherein a new range of lens positions, the new search range, or lens positions within a new range of lens positions are determined that extend beyond the previous search range. If it is determined that the focus values are not increasing, the process 200 moves to block 245, wherein a new search range or lens positions within a new search range are determined that extends before the previous search range. In some embodiments, the lens positions in the new search range may include one or more lens positions from the previous search range. In other embodiments, a new search range may not be determined, but the front or end of the previous search range may be extended to continue in one direction one or more times until a maximum focus value is found.

After a lens positions within the new range of lens positions have been determined at either block 245 or block 250, the process 200 moves to block 255, wherein the lens of the camera is set or moved to the determined lens positions in the new range of lens positions. The process 200 then moves to block 260 wherein images are captured at each determined lens positions within the new range of lens positions. It should be recognized that blocks 255 and blocks 260 can be performed in concert, wherein an image is captured at a lens position after the lens is moved or set to the lens positions by the actuator and before the lens is set to another determined lens position.

After the series of images are captured, the process 200 moves to block 265, wherein focus values are generated or determined for each captured image for the determined lens positions in the new range of lens positions. In alternative embodiments, a focus value may be generated or determined for each image after the image is captured but prior to the capture of a subsequent image.

After the focus values are generated, the process 200 moves to block 270, wherein a focus value curve or set of data representing a focus value curve is generated or determined from the focus values generated or determined at block 265. In some embodiments, a new focus value curve or set of data representing a focus value curve is generated or determined. Alternatively, focus values may be appended to the existing focus value curve or set of data representing a focus value curve. In some embodiments, a focus value curve may not be generated. Instead, a determination can be made whether the maximum focus value is within the search range by comparing the focus values and corresponding lens positions of the focus values. It may be determined that a maximum focus value exists if a focus value at a lens position is higher than the focus values at lens positions before and after the lens position. In some embodiments, the determination of whether a maximum focus value is within the search range may be performed before capturing images at all lens positions within the search range. The determination of whether a maximum focus value is within the search range may be performed after each image is captured.

In some embodiments, it may be determined that a maximum focus value is within the range of lens positions if the highest determined focus value corresponds to an intermediate lens position in the new search range. The process 200 then returns to block 235.

Figure 3A:
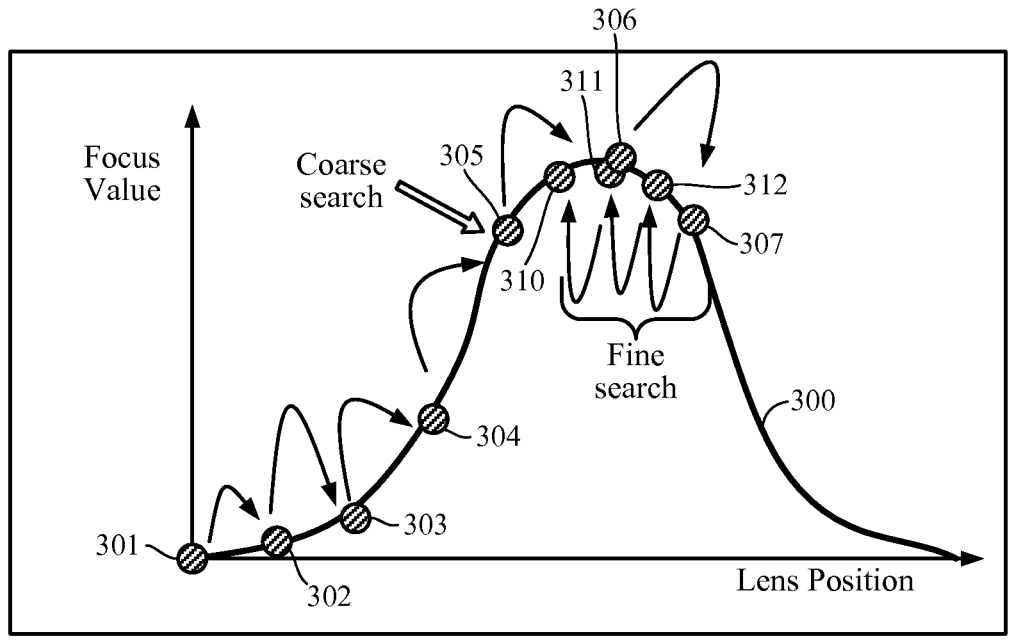
FIG. 3A is a graph illustrating an example of a focus value curve that illustrates contrast-based autofocus according to some embodiments.

FIG. 3A depicts an illustrative embodiment of a series of lens positions on a focus value curve 300 determined using contrast-based AF. A focus value curve, shown here for illustrative purposes, illustrates the relationship between a lens position on the x-axis and a focus value on the y-axis. Contrast-based AF generally utilizes a coarse search, one in which images are captured using different lens positions covering a wide range of possible lens positions, followed by a fine search covering a smaller range of lens positions based on the contrast values determined in the coarse search. The focus value curve 300 illustrates a coarse search including coarse search lens positions 301, 302, 303, 304, 305, 306, and 307 that correspond to lens positions moving in one direction, as shown. The focus value curve 300 also illustrates a fine search based on the course search including fine search lens positions 310, 311, and 312, and 307. Lens position 307 is used as both a coarse search and fine search lens position. The focus value data from the coarse search lens positions can be used to estimate a smaller range of lens positions, the fine search range, which may contain a maximum focus value. Focus values may then be determined at several lens positions in the fine search range, the fine search lens positions, to find a maximum focus value.

FIG. 3B depicts an illustrative embodiment of a series of lens positions on a focus value curve 350 determined using depth-assisted AF. The focus value curve 350 shows a depth-assisted lens position 351. Most depth-assisted AF technologies, such as phase detection AF, time-of-flight AF, and dual camera AF, generate or determine a depth estimation and then convert the depth estimation to a lens position to bring an object or scene into focus. Generally, depth estimation is utilized to set a much smaller range of potential desired lens positions, which is then used in performing a search with contrast-based AF. The focus value curve 350 further shows a search range including search lens positions 355, 356, and 357. The depth estimation can be used to estimate a smaller range of lens positions which may contain a maximum focus value. Focus values may then be determined at several lens positions in the search range, the determined lens positions, to find a maximum focus value, should the maximum exist within the search range. The focus value curve is for illustrative purposes and need not be generated to determine lens positions in a search range or focus values.

FIGS. 4A-C depict an example of a focus value curve for an imaging device showing a movable lens range from 0 to 399 lens positions, where "0" represents a lens position for focusing on objects close to an imaging device (close objects) and 399 represents a lens position for focusing on objects far from an imaging device (far objects). In the example depicted in FIGS. 4A-C, an object in a scene is located at 50 cm and a depth sensor estimates that a corresponding lens position is around lens position 251, and thus to focus on the object, the lens position should be at 251. This example shows a step size of 10 lens positions. A tolerance is determined around lens position 251 of twice the step size, constituting a search range between lens positions 231-271. A search begins at lens position 231, and the lens moves in increments of 10 lens positions to lens position 271. Images are captured at positions 231, 241, 251, 261, and 271, and the focus values are calculated for those images.

FIG. 4A depicts an ideal case where the peak focus value is at located at lens position 251. In this example, the maximum focus value is determined in the first search range, and therefore, an extension of the search range is not required. In some instances, open loop VCM may cause the values represented by the curve to shift as shown in FIGS. 4B and 4C.

FIG. 4B depicts a trend of decreasing focus values from lens positions 231-271. This indicates that a maximum focus value may exist at a lens position between lens positions 0-231. Therefore, a search range extension towards lens position 0 may be necessary to find the maximum focus value. For example, a new search range may be generated from lens positions 241-201. Then, the lens can move in the direction towards lens position 201 in the following the order: 241, 231, 221, 211, 201. At each position an image can be captured and a focus value determined. Then, a determination may be made whether the maximum focus value lies within the range 241-201.

FIG. 4C depicts a trend of increasing focus values from lens positions 231-271. This indicates that a maximum focus value may exist at a lens position between lens positions 271-399. Therefore, a search range extension towards lens position 399 may be necessary to find the maximum focus value. For example, a new search range may be generated from lens positions 271-311. At each position an image can be captured and a focus value determined. Then, a determination may be made whether the maximum focus value lies within the range 271-311. If a maximum focus value is still not found in the range 271-311, the search range may be extended again to lens positions 311-351. In some embodiments, a maximum number of search range extensions may be predefined. Alternatively, a user may be able to set a maximum number of search range extensions.

Figure 4D:
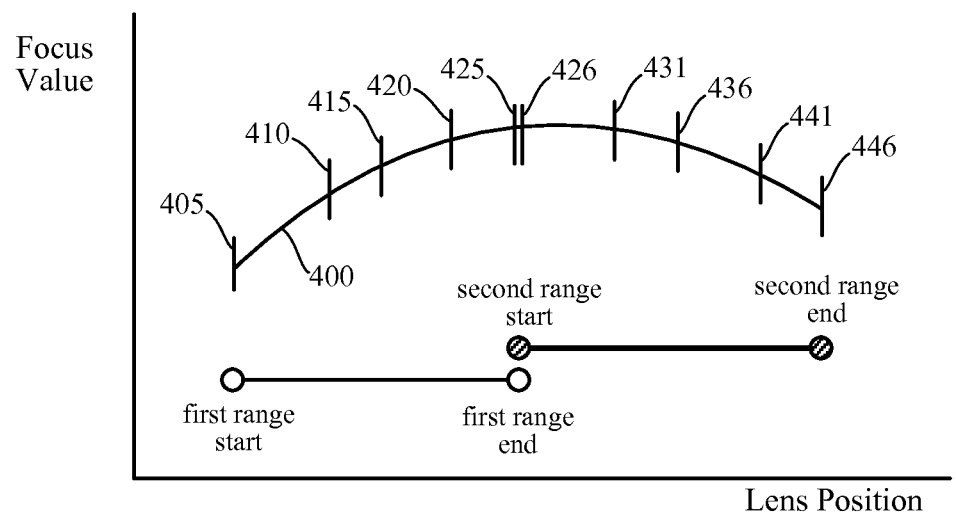
FIG. 4D is a graph showing focus value curve representing some embodiments.

FIG. 4D depicts a focus value curve 400 representing an illustrative embodiment. The focus value curve 400 shows a first lens position 405, a second lens position 425, and intermediate lens positions 410, 415, and 420 in a first range of lens positions. The lens positions in the first range of lens positions can be based at least in part on a depth estimation as described with regard to block 230 of process 200 as depicted in FIG. 2. As depicted by the slope of the focus value curve 400, the magnitude of the focus values is increasing at all determined lens positions from lens position 405 to lens position 425, indicating that the focus values may continue to increase in value at lens positions extending beyond lens position 425. As described with reference to block 250 of process 200, a new search range can be generated extending beyond second lens position 425 to determine a maximum focus value. FIG. 4D further depicts a second range of lens positions having a first lens position 426, a second lens position 446, and intermediate lens positions 431, 436, and 441, which can be generated based at least in part on the data represented by the slope of the focus value curve between lens positions 405 and 426. For example, the scope of the second search range may differ based on the magnitude of the data represented by the slope at one or more points throughout the first search range or the changes in the data represented by the slope between one or more points throughout the first search range. In some embodiments, the first lens position of the second range of lens positions can be located at the same lens position as the second lens position of the first range of lens positions. In some embodiments, the focus value measured at the second lens position for the first range of lens positions may be used again when generating a new search range without capturing another image at the second lens position.

Figure 4E:
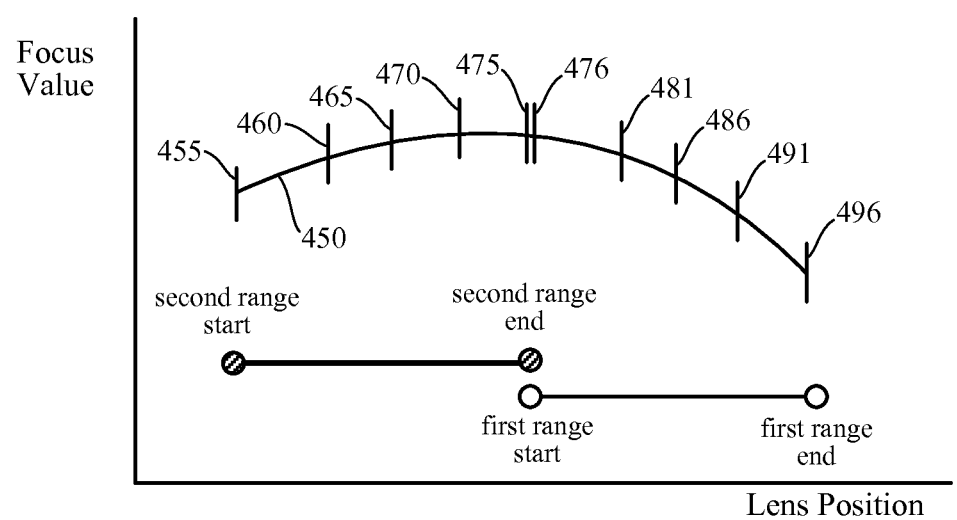
FIG. 4E is a graph showing focus value curve representing some embodiments.

FIG. 4E depicts a focus value curve 450 representing an illustrative embodiment. The focus value curve 450 shows a first lens position 476, a second lens position 496, and intermediate lens positions 481, 486, and 491 in a first range of lens positions. The lens positions in the first range of lens positions can be based at least in part on a depth estimation as described with regard to block 230 of process 200 as depicted in FIG. 2. As depicted by the slope of the focus value curve, the magnitude of the focus values is decreasing at all determined lens positions from lens position 476 to lens position 496, indicating that the focus values may increase in value at lens positions extending before the first lens position 476. As described with reference to block 245 of process 200, a new search range can be generated extending before the first lens position 476. FIG. 4E further depicts a second range of lens positions having a first lens position 455, a second lens position 475, and intermediate lens positions 460, 465, and 470, which can be generated based on the data represented by the slope of the focus value curve between lens positions 476 and 496. For example, the scope of the second search range may differ based on the magnitude of the data represented by the slope at one or more points throughout the first search range or the changes in the data represented by the slope between one or more points throughout the first search range. In some embodiments, the second lens position of the second range of lens positions can be located at the same lens position as the first lens position of the first range of lens positions. In some embodiments, the focus value measured at the first lens position of the first range of lens positions may be used again when generating the second search range without capturing another image at the second lens position of the second range of lens positions.

Figure 5:
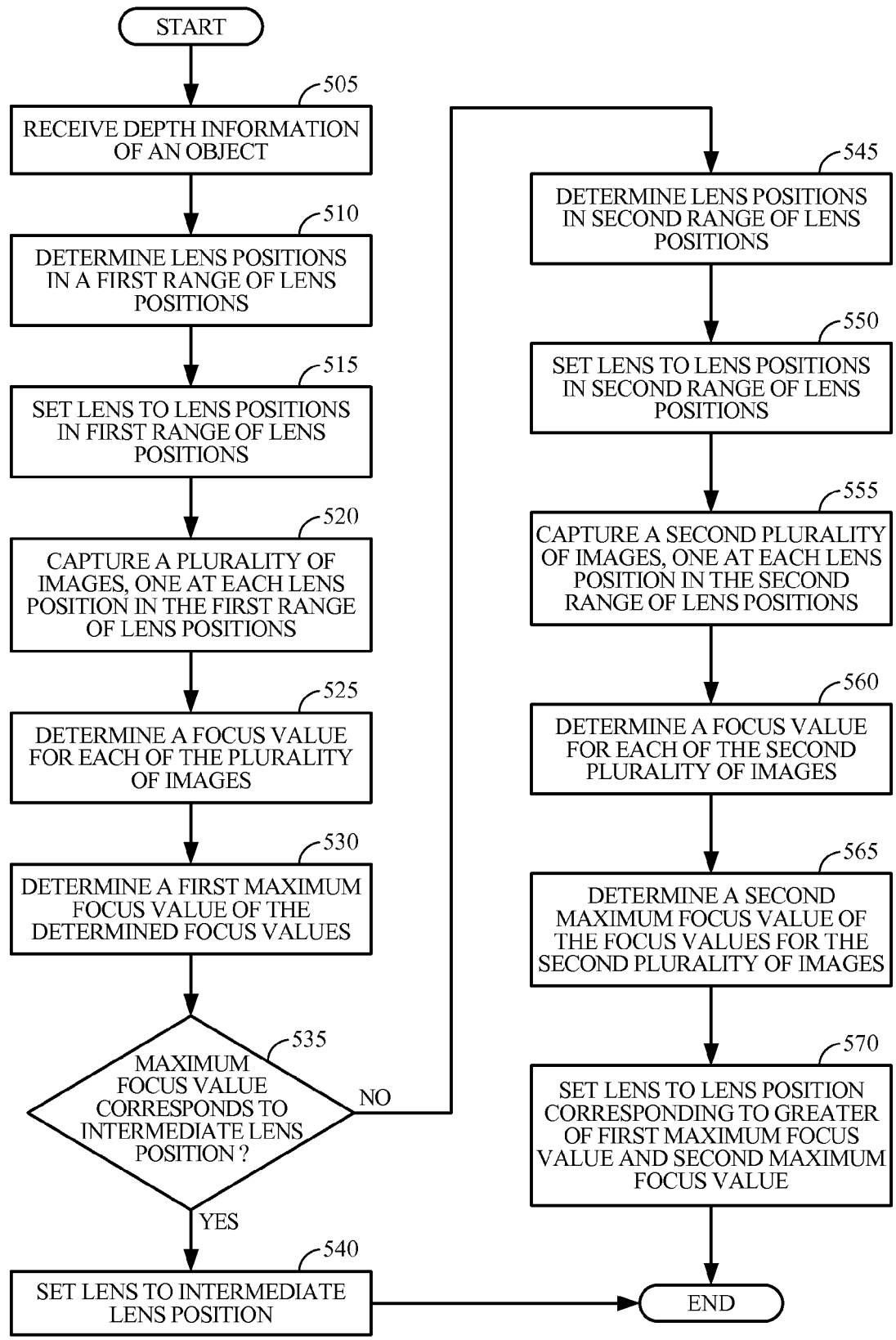
FIG. 5 is a flowchart illustrating an example of an embodiment of a method of autofocusing.

FIG. 5 depicts a flowchart of one embodiment of a process 500 for an embodiment of autofocusing. The process begins at a start block and then moves to block 505, wherein depth information of an object within a scene is received. The depth information may be received from a depth sensor, such as depth sensor 116 as depicted in FIG. 1.

After depth information is received, the process 500 moves to block 510, wherein lens positions in a first range of lens positions are determined. The lens positions in the first range of lens positions can be determined based on the depth information. The depth of the object can be estimated using depth estimation methods such as phase detection AF, time-of-flight AF, or dual camera AF or other methods. The estimation can be used to determine a first range of lens positions that may correspond to a maximum focus value of all possible lens positions available for an autofocus lens system of an imaging device. The first range of lens positions can include a first lens position, a second lens position, and one or more intermediate lens positions. Each lens position corresponds to a focusing distance for the lens system. The focusing distance at the first lens position can be less than the focusing distance at the second lens position. The focusing distances at the lens positions in the first range of lens positions can increase at each adjacent lens position from the first lens position to the second lens position.

After the lens positions in the first range of lens positions are determined, the process 500 moves to block 515, wherein a lens of the autofocus lens system, such as lens 110 as depicted in FIG. 1, is set to the lens positions in the first range of lens positions. The lens can be set by an actuator, such as actuator 112 as depicted in FIG. 1. In some embodiments, the actuator can be an open-loop VCM actuator.

After the lens of the autofocus lens system is set to the lens positions in the first range of lens positions, the process 500 moves to block 520, wherein a plurality of images are captured over a period of time, one of the plurality of images being captured at each of the lens positions in the first range of lens positions. The plurality of images can be captured by an image sensor, such as image sensor 114 as depicted in FIG. 1.

After the plurality of images are captured, the process 500 moves to block 525, wherein a focus value is determined for each of the plurality of images. Each focus value can indicate a measure of how well an image is focused. In some embodiments, the focus values can indicate sharpness or contrast of an image.

After a focus value is determined for each of the plurality of images, the process 500 moves to block 530, wherein a first maximum focus value is determined from the focus values determined for each of the plurality of images.

After the first maximum focus value is determined, the process 500 moves to decision block 535, wherein a decision is made whether the maximum focus value corresponds to an intermediate lens position of the first range of lens positions.

If a decision is made that the maximum focus value corresponds to an intermediate lens position of the first range of lens positions, the process 500 moves to block 540, wherein the lens is set to the intermediate lens position. After the lens is set to the intermediate lens position, the process concludes.

If a decision is made that the maximum focus value does not correspond to an intermediate lens position of the first range of lens positions, the process 500 moves to block 545, wherein lens positions in a second range of lens positions are determined. The lens positions in the second range of lens positions can be determined such that the lens positions in the second range of lens positions have focusing distances less than the focusing distance at the first lens position when the maximum focus value corresponds to the first lens position. The lens positions in the second range of lens positions can be determined such that the lens positions in the second range of lens positions have focusing distances greater than the focusing distance at the second lens position when the maximum focus value corresponds to the second lens position. The second range of lens positions can have a first lens position, a second lens position, and one or more intermediate lens positions.

After the lens positions in the second range of lens positions are determined, the process 500 moves to block 550, wherein the lens of the autofocus lens system is set to the lens positions in the second range of lens positions. In some embodiments, the lens is set to the lens position in the second range of lens positions in order of the increasing difference in focusing distance from the focusing distance of the second lens position in the first range of lens positions. In some embodiments, the lens is set to the lens positions in the second range of lens positions in an order that results in the least movement of the actuator. In some embodiments, the lens is set to the lens positions in the second range of lens positions in an order that will result in the least total amount of time to set the lens to each lens position in the second range of lens positions.

After the lens is set to the lens position in the first range of lens positions, the process 500 moves to block 555, wherein a second plurality of images are captured over a period of time, one of the second plurality of images being captured at each of the lens positions in the second range of lens positions.

After the second plurality of images are captured, the process 500 moves to block 560, wherein a focus value is determined for each of the second plurality of images.

After a focus value is determined for each of the second plurality of images, the process 500 moves to block 565, wherein a second maximum focus value is determined from the focus values determined for each of the second plurality of images.

After the second maximum focus value, the process 500 moves to block 570, wherein the lens is set to the lens position corresponding to the greater of the first maximum focus value and the second maximum focus value. The process then concludes.

Some embodiments may include an additional step of capturing an image at the lens position corresponding to the first maximum focus value when the first maximum focus value corresponds to an intermediate lens position.

Some embodiments may include an additional step of capturing an image at the lens position corresponding to the greater of the first maximum focus value and the second maximum focus value when the first maximum focus value does not correspond to an intermediate lens position.

Implementations disclosed herein provide systems, methods and apparatus for an imaging device with autofocus technology. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may include RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for autofocus in an imaging device, the method comprising:
    receiving depth information of an object within a scene;
    determining, for an autofocus lens system, a first lens position and a second lens position defining outer boundaries of a first range including a first plurality of lens positions based on the depth information;
    for each lens position of the first plurality of lens positions:
        setting a lens of the autofocus lens system to the lens position; and
        generating a focus value associated with the lens position;
    generating, based on the focus values associated with each of the first plurality of lens positions, data representing a focus value curve;
    identifying a slope of the focus value curve at each of the first plurality of lens positions;
    determining, based at least partly on the slope of the focus value curve at each of the first plurality of lens positions, whether a maximum focus value is within the first range;
    in response to determining that the maximum focus value is not within the first range:
        determining that the slope of the focus value curve is increasing at one of the first lens position and the second lens position;
        determining a second range including a second plurality of lens positions, the second range bounded by the one of the first lens position and the second lens position and a third lens position outside of the first range;
        setting the lens to the second plurality of lens positions in the second range;
        determining whether the maximum focus value is within the second range of lens positions; and
        in response to determining that the maximum focus value is within the second range, capturing an image by the imaging device with the lens at a position in the second range corresponding to the maximum focus value.

2. The method of claim 1, wherein the focus value indicates a measure of how well an image is focused, a higher focus value indicating a more well focused image.

3. The method of claim 1, further comprising determining a focus value at each of the second plurality of lens positions in the second range.

4. The method of claim 1, wherein each lens position corresponds to a focusing distance for the autofocus lens system, the focusing distance at the first lens position in the first range less than the focusing distance at the second lens position in the first range, and wherein the second plurality of lens positions in the second range are determined such that, the second plurality of lens positions in the second range have focusing distances less than the focusing distance at the first lens position when the slope of the focus value curve is increasing at the first lens position, and the second plurality of lens positions in the second range have focusing distances greater than the focusing distance at the second lens position when the slope of the focus value curve is increasing at the second lens position.

5. The method of claim 1, wherein the focus value indicates sharpness or contrast of an image captured with the lens at a set lens position.

6. The method of claim 1, wherein said setting the lens comprises moving the lens by an open-loop VCM actuator.

7. The method of claim 1, wherein the first plurality of lens positions in the first range are separated by a uniform step size, the step size corresponding to one or more intermediate lens positions between the first and second lens positions in the first range.

8. The method of claim 1, further comprising determining an order to set the lens to second plurality of lens positions in the second range that minimizes a total time to set the lens to each lens position.

9. The method of claim 1, wherein the depth information represents a distance of the object in the scene from the imaging device, the method further comprising:

determining a first intermediate lens position corresponding to a focusing distance corresponding to the distance of the object from the imaging device; and determining the first lens position and second lens position based on a tolerance on each side of the first intermediate lens position.

10. A non-transitory computer readable storage medium storing instructions that, when executed, cause at least one physical computer processor of an imaging device to perform a method comprising:

receiving depth information of an object within a scene;

determining, for an autofocus lens system, a first lens position and a second lens position defining outer boundaries of a first range including a first plurality of lens positions based on the depth information;

for each lens position of the first plurality of lens positions:

setting a lens of the autofocus lens system to the lens position; and generating a focus value associated with the lens position;

generating, based on the focus values associated with each of the first plurality of lens positions, data representing a focus value curve;

identifying a slope of the focus value curve at each of the first plurality of lens positions;

determining, based at least partly on the slope of the focus value curve at each of the first plurality of lens positions, whether a maximum focus value is within the first range;

in response to determining that the maximum focus value is not within the first range:

determining that the slope of the focus value curve is increasing at one of the first lens position and the second lens position;

determining a second range including a second plurality of lens positions, the second range bounded by the one of the first lens position and the second lens position and a third lens position outside of the first range;

setting the lens to the second plurality of lens positions in the second range;

determining whether the maximum focus value is within the second range of lens positions; and in response to determining that the maximum focus value is within the second range, capturing an image by the imaging device with the lens at a lens position in the second range corresponding to the maximum focus value.

11. The non-transitory computer readable storage medium of claim 10, wherein the method further comprises determining a focus value at each of the lens positions in the second range of lens positions.

12. The non-transitory computer readable storage medium of claim 10, wherein each lens position corresponds to a focusing distance for the autofocus lens system, the focusing distance at the first lens position in the first range less than the focusing distance at the second lens position in the first range, and wherein the second plurality of lens positions in the second range are determined such that, the second plurality of lens positions in the second range have focusing distances less than the focusing distance at the first lens position when the slope of the focus value curve is increasing at the first lens position, and the second plurality of lens positions in the second range have focusing distances greater than the focusing distance at the second lens position when the slope of the focus value curve is increasing at the second lens position.

13. The non-transitory computer readable storage medium of claim 10, wherein depth information represents a distance of an object in the scene from the imaging device, and wherein the method further comprises:

determining a first intermediate lens position corresponding to a focusing distance corresponding to the distance of the object from the imaging device; and determining the first lens position and second lens position based on a tolerance on each side of the first intermediate lens position.

14. An apparatus, comprising:

an autofocus lens system of an imaging device, the autofocus lens system comprising a lens moveable to a plurality of lens positions within a first range of lens positions and a plurality of lens positions within a second range of lens positions;

an image sensor configured to capture a plurality of images;

a memory component configured to store images captured by the image sensor;

a depth sensor configured to capture depth information of an object within a scene;

an actuator coupled to the autofocus lens system and configured to move the lens to the plurality of lens positions within the first range of lens positions in response to the depth information; and a processor in communication with the memory component, the actuator, the image sensor, and the depth sensor, the processor configured to:
  determine a focus value at each of the lens positions in the first range of lens positions;
  generate, based on the focus values associated with each of the first plurality of lens positions, data representing a focus value curve;
  identify a slope of the focus value curve at each of the first plurality of lens positions;
  determine, based at least partly on the slope of the focus value curve at each of the first plurality of lens positions, whether a maximum focus value is within the first range;
  in response to determining that the maximum focus value is not within the first range of lens positions,
    determine that the slope of the focus value curve is increasing at one of a first lens position and a second lens position bounding the first range,
    determine the plurality of lens positions within the second range of lens positions, the second range bounded by the one of the first lens position and the second lens position and a third lens position outside of the first range, and
    determine a focus value at each of the lens positions within the second range of lens positions,
  wherein the actuator is configured to move the lens to a subset of the plurality of lens positions within the second range of lens positions, and
  wherein the processor is configured to generate an image at a lens position corresponding to the maximum focus value determined.

15. The apparatus of claim 14, wherein the focus value indicates a measure of how well an image is focused, a higher focus value indicating a more well focused image.

16. The apparatus of claim 14, wherein the processor is further configured to control the actuator to set the lens to a lens position corresponding to the maximum focus value determined.

17. The apparatus of claim 14, wherein each lens position corresponds to a focusing distance for the autofocus lens system, the focusing distance at the first lens position in the first range less than the focusing distance at the second lens position in the first range, and wherein the second plurality of lens positions in the second range are determined such that,
  the second plurality of lens positions in the second range have focusing distances less than the focusing distance at the first lens position when the slope of the focus value curve is increasing at the first lens position, and
  the second plurality of lens positions in the second range have focusing distances greater than the focusing distance at the second lens position when the slope of the focus value curve is increasing at the second lens position.

18. The apparatus of claim 14, wherein the focus value indicates sharpness or contrast of an image captured with the lens at a set lens position.

19. The apparatus of claim 14, wherein the actuator comprises an open-loop VCM actuator.

20. The apparatus of claim 14, wherein the lens positions in the first range of lens positions are separated by a uniform step size, the step size corresponding to one or more intermediate lens positions between the lens position in the first range of lens positions.

21. The apparatus of claim 14, wherein the processor is configured to determine an order to set the lens to lens positions in the second range of lens positions that minimizes a total time to set the lens to each lens position.

22. The apparatus of claim 14, wherein the depth information represents a distance of the object in the scene from the imaging device, and wherein the processor is configured to:
  determine a first intermediate lens position corresponding to a focusing distance corresponding to the distance of the object from the imaging device; and
  determine the first lens position and second lens position based on a tolerance on each side of the first intermediate lens position.

23. An apparatus, comprising:
an autofocus lens system comprising a lens moveable to a plurality of lens positions within a first range of lens positions and a plurality of lens positions within a second range of lens positions;
a means for capturing a plurality of images;
a means for storing captured images;
a means for capturing depth information of an object within a scene;
a means for setting the position of the lens configured to move the lens to the plurality of lens positions within the first range of lens positions in response to the depth information; and
a processor configured to:
  determine a focus value at each of the lens positions in the first range of lens positions;
  generate, based on the focus values associated with each of the first plurality of lens positions, data representing a focus value curve;
  identify a slope of the focus value curve at each of the first plurality of lens positions;
  determine, based at least partly on the slope of the focus value curve at each of the first plurality of lens positions, whether a maximum focus value is within the first range;
  in response to determining that the maximum focus value is not within the first range of lens positions,
    determine that the slope of the focus value curve is increasing at one of a first lens position and a second lens position bounding the first range,
    determine the plurality of lens positions within the second range of lens positions, the second range bounded by the one of the first lens position and the second lens position and a third lens position outside of the first range, and
    determine a focus value at each of the lens positions within the second range of lens positions,
  wherein the means for setting the position of the lens is configured to move the lens to a subset of the plurality of lens positions within the second range of lens positions, and
  wherein the processor is configured to generate an image at a lens position corresponding to the maximum focus value determined.

24. The apparatus of claim 23, wherein the focus value indicates a measure of how well an image is focused, a higher focus value indicating a more well focused image.

25. The apparatus of claim 23, wherein the processor is further configured to control the means for setting the position of the lens to set the lens to a lens position corresponding to the maximum focus value determined.

26. The apparatus of claim 23, wherein each lens position corresponds to a focusing distance for the autofocus lens system, the focusing distance at the first lens position in the first range less than the focusing distance at the second lens position in the first range, and wherein the second plurality of lens positions in the second range are determined such that, the second plurality of lens positions in the second range have focusing distances less than the focusing distance at the first lens position when the slope of the focus value curve is increasing at the first lens position, and the second plurality of lens positions in the second range have focusing distances greater than the focusing distance at the second lens position when the slope of the focus value curve is increasing at the second lens position.

27. The apparatus of claim 23, wherein the focus value indicates sharpness or contrast of an image captured with the lens at a set lens position.

28. The apparatus of claim 23, wherein the lens positions in the first range of lens positions are separated by a uniform step size, the step size corresponding to one or more intermediate lens positions between the lens position in the first range of lens positions.

29. The apparatus of claim 23, wherein the processor is configured to determine an order to set the lens to lens positions in the second range of lens positions that minimizes a total time to set the lens to each lens position.

30. The apparatus of claim 23, wherein the depth information represents a distance of the object in the scene from the imaging device, and wherein the processor is configured to:

determine a first intermediate lens position corresponding to a focusing distance corresponding to the distance of the object from the imaging device; and determine the first lens position and second lens position based on a tolerance on each side of the first intermediate lens position.

* * * * *